Jan. 16, 1934.  A. NIEDERMANN  1,944,104

COMPASS FOR ORIENTATION

Filed Jan. 6, 1932

Inventor:

A. Niedermann

Patented Jan. 16, 1934

1,944,104

UNITED STATES PATENT OFFICE 1,944,104

COMPASS FOR ORIENTATION

Albert Niedermann, Hongg, near Zurich, Switzerland

Application January 6, 1932, Serial No. 585,136, and in Switzerland January 20, 1931

1 Claim. (Cl. 33—222)

There are already compasses for measuring horizontal angles on the map and transferring the ascertained bearing of the marching direction into the field by means of an aiming device. These compasses must be put at an oblique angle to the map's meridian, since their magnetic needle-boxes, placed rotatively in the case, are solely provided with a top transparent plate. Again, compasses have been suggested to be put on the map provided with loose, i. e. detachable guide-hands. Finally there are compasses with their needle-boxes covered by transparent plates on top and bottom, as they lack marks of the chief compass-points on their bottom-side, they can be used on one side only. The improvement in the present compass, i. e. the use of the top- as well as of the bottom-side, made possible by the establishment of the meridian-marks on its bottom-side, running parallel with a pair of sides of the rectangular case, becomes apparent in the later treatment of the example at hand in Fig. 2 of the drawing.

The drawing shows the object of the invention in a constructional example:

Figure 1:
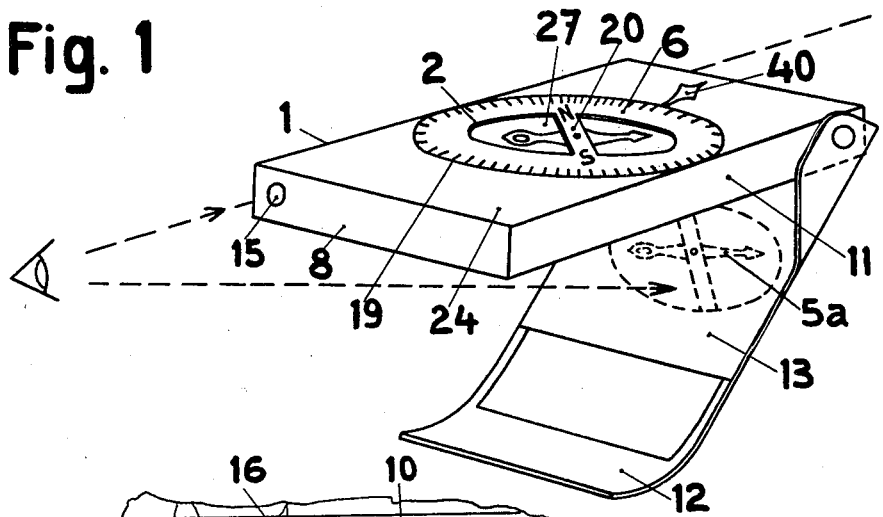
Fig. 1 shows the instrument when used in the field.

The instrument is made up of three main parts movable against each other, a box 2 with magnetic needle 5, a rectangular case 1 with sight opening 15 or similar aiming device on its top face 24 and meridian-marks N, 16 and S, 18 on its bottom-face 23, a hinged cover 12 with mirror-finished inside 13.

Figure 2:
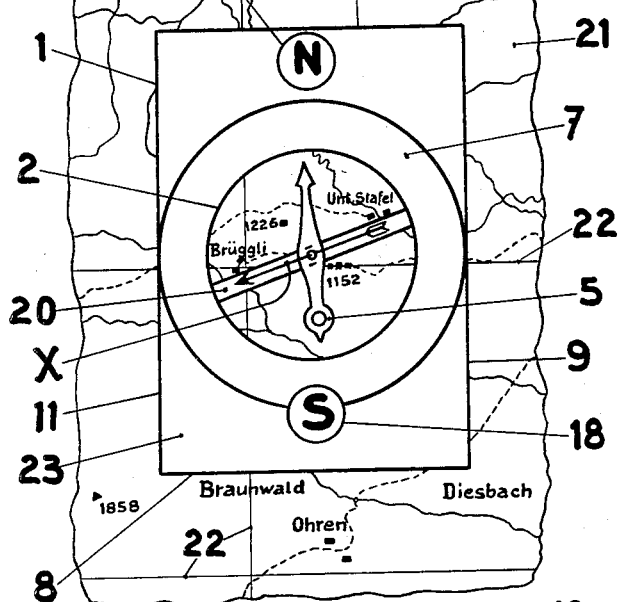
Fig. 2 shows it when used turned over on the map.
Figure 3:
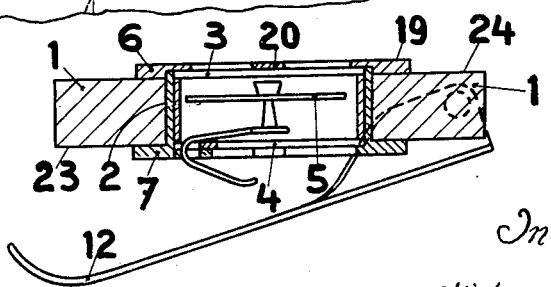
Fig. 3 shows a section of it.

The needle-box 2 has its opposite sides mounted by flanges 6, 7, making it rotative relative to case 1, and closed by transparent plates 3, 4. Said flange 6 carries a circular division 19, provided with a diametrical bridge 20 bisecting the numerical division 19 of degrees. Said bridge also carries on its bottom-side an arrow $x$, visible only from said bottom-side 23 of said case 1. 27 is the declination-mark painted on said top transparent cover plate 3, setting off the degrees of magnetic declination against the north, i. e. starting point of the circular division. The top-face 24 also carries an index 40 cooperating with the circular scale 19. The use of the instrument and its improvement over existing compasses for terrestrial use is best illustrated by means of the example of map reading and orientation at hand in Fig. 2:

Find in the field the direction of march toward a certain point (Bruggli) which from the observer's position (Unt. Staffel) cannot be seen.

The solution of this problem requires two steps: find from the map 21 the bearing of the line Unt. Staffel-Bruggli, and transfer this bearing into the field.

Open cover 12, and put top-face 24 unto the map 21 in such a way, that the mark N, 16 lies toward the map's north. Move the instrument now parallel to itself and rotate box 2 until the bridge 20 is aligned with the direction Unt. Staffel-Bruggli, with the arrow's point lying toward the point looked for, i. e. Bruggli. Sides 9 and 11 of case 1 now run parallel with the map's meridian. Up to now the observer has not paid any attention at all to the magnetic needle 5. The observer now is ready for the second step, i. e. the transfer of the ascertained bearing onto the field: Lift the instrument up to the level of your eyes, turn it over and open cover 12 at an angle of about 45 degrees. Turn about yourself on the spot until the needle's point $5a$ lies off the mark of declination 27, and then look through the sighting bore 15 for some prominent topographical or other feature serving as initial point for the march. Having reached that point, sight for another point ahead, with the needle's point again to lie off mark 27. The position of box 2 relative to case 1 must of course not have been disturbed in the time elapsed between the two sightings or any subsequent ones during the march.

The guide-hand 20, or arrow $x$, during this process would have to be taken off and reset in some of the existing compasses, although they too are set parallel with the map's meridian.

What is desired to be secured by Letters Patent is set forth in the following claim:

A device for measuring horizontal angles in the field and on the map comprising a circular box, a magnetic needle pivoted therein, said box having its opposite sides closed by transparent plates, a case, flanges on said box mounting it rotatively in a circular opening of said case the upper flange having compass graduation thereon; said case having on its bottom face marks for aligning it on the map with the map's meridian, said case having an index on its upper side cooperating with said box, said box also having an aligning mark extending diametrically thereacross, said mark being visible only from the side opposite said graduated flange and being aligned on the map with a predetermined direction.

ALBERT NIEDERMANN.